United States Patent [19]

Boogaart

[11] 4,381,838
[45] May 3, 1983

[54] SUPPORT SYSTEM FOR POTTED PLANTS

[76] Inventor: Joseph D. Boogaart, 1048 N. Ustler Rd., Apopka, Fla. 32703

[21] Appl. No.: 208,865

[22] Filed: Nov. 21, 1980

[51] Int. Cl.³ .............................................. A47F 7/00
[52] U.S. Cl. .......................................... 211/71; 47/39
[58] Field of Search ...................... 211/71, 74, 13, 182, 211/189, 181; 47/83, 39

[56] References Cited

U.S. PATENT DOCUMENTS 1,300,629  4/1919  Macaw .............................. 47/39 X

FOREIGN PATENT DOCUMENTS 344246  11/1921  Fed. Rep. of Germany .......... 47/39
1150840  1/1958  France ..................................... 47/39

Primary Examiner—Francis K. Zugel
Assistant Examiner—Robert W. Gibson, Jr.
Attorney, Agent, or Firm—Duckworth, Allen, Dyer & Pettis

[57] ABSTRACT

There is disclosed a system for supporting potted plants in closed environment such as a nursery, wherein the plants are supported by flexible wires under tension. A pair of truss members are parallely disposed and ridigly set on the ground. Each truss member is provided with a plurality of support bars. A plurality of intermediate vertical structures are provided, and each one is provided with a plurality of spacer bars. A metal tube is used to connect the top of the truss members with a concrete foundation on the ground for support. A plurality of substantially parallel and flexible wires are connected to the truss members and are tensioned to provide rigidity. The wires are supported vertically by a plurality of support bars connected to each intermediate member.

10 Claims, 7 Drawing Figures

SUPPORT SYSTEM FOR POTTED PLANTS

BACKGROUND OF THE INVENTION

This invention relates generally to methods of growing plants in a closed environment, such as a nursery, and more particularly to an apparatus which enables more efficient utilization of the enclosed volume found in nurseries.

There are three normal methods of growing containerized plant material, these include placing it on the ground, benching it, or placing it on stair step structure. The on the ground system is where the plants are actually placed on the bare earth or on a type of ground cover that inhibits weed growth. When plants are placed above ground level it is usually on a bench system. This consists of a frame covered with wood, or other suitable material that allows the container to rest on a flat surface. An alternative to this type of bench system is the placement of strips of wood across the bench spaced at intervals that allow the pots to fit between the wood strips which are nailed to the frame. The third growing system is the stair step method; here two sets of stairlike structures are set opposing each other so that the highest platforms are together in the center. This gives a step-up effect from two sides and meeting in the middle.

There are certain drawbacks and advantages to each system. The obvious advantage of the "on ground" method is the low ingoing costs. There are, however, increased costs in production such as increased fuel consumption, unfavorable plant environment, less productive work conditions and additional weed control cost.

The bench system takes the plants off the ground and therefore provides a better environment for healthy growth. This improved environment is at the expense of space utilization since more aisles are required creating more unproductive area. Though the benches are more sanitary than the ground, they still provide breeding areas for bacteria and fungus. Benches do not alleviate the problems of pot turnover unless the slat method is used. The problems with the slats, however, is that they do not allow versatility since they are constructed for one size container and the width is set and cannot be utilized for other widths of pots.

The stair-step system allows better use of growing area because of the utilization of vertical space. The disadvantage with the system is that there cannot be any overhang because of the light blockage and water runoff from the higher platforms. Some efficiency is achieved, but not enough to justify the tremendous costs of constructing the system. Again, the flat surfaces are problem areas for fungus and bacteria.

A search of the prior art in the patent office disclose the following patents: U.S. Pat. No. 1,063,961 (Dreyer, June 10, 1913), U.S. Pat. No. 1,001,416 (Lloyd, Aug. 22, 1911), U.S. Pat. No. 1,300,629 (Macaw, Apr. 15, 1911). The Dreyer and Lloyd patent are directed to display stands for flowers and are not suitable for use in nurseries or for the volume growing of plant material. The additional disadvantage of these two systems is that they are designed for a single width of flower pots and cannot be used for the various sizes of flower pots that are encountered in normal growing operations. U.S. Pat. No. 1,300,629 is similar to the slat system described herein above except that it provides for a variable width thus affording versatility in the size of pots that may be utilized. The disadvantage of this system is that it describes the use of a rigid rail for supporting the containerized plant material. The system described in the Macaw patent would today involve high cost both in manufacture and assembly and require upright supports every few feet, to prevent the rails from bending under their own weight.

SUMMARY OF THE INVENTION

The improved containerized plant material growing system of this type according to the present invention is characterized by a means for supporting containerized plant materials by flexible wires which are made rigid by tension. A pair of parallel disposed vertically tapering truss members are used to provide lateral support for a plurality of pairs of wires that are under tension. A plurality of vertically disposed intermediate tapered members each having a plurality of support bars are provided to maintain spaced vertical support on the wires so as to prevent sagging of the wires. Tension bars are provided on the truss members to maintain tension. Each support bar has at least two openings, one for a permanent wire hole and at least one having an opening through which the wire can be removed. The combination of supports and tension prevent sagging.

This growing system provides a number of advantages over that known in the prior art, including the cheap and economical means of mass production. Additionally, the starting materials are easily available and easy to put together. Another advantage is that it can utilize the volume within an enclosed nursery area with greater efficiency than the systems known in the prior art. Since the pots are suspended by wires the pots are not in contact with flat surfaces, thus there is greater air circulation and the growth of moss, molds, fungus and bacteria can be prevented. Energy savings have also been achieved not only due to the increased utilization of the volume within the nursery area but also due to the better air flow that is provided and the increased volume of soil being utilized as a heat sink. The taper of the intermediate members allow pots to collect and store radiant heat from the sun.

Further features of the invention included the arrangement of the support bar which is used to vary the distance between the permanent wire and the variable wire thereby accomodating a wide variety of widths for flower pots.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
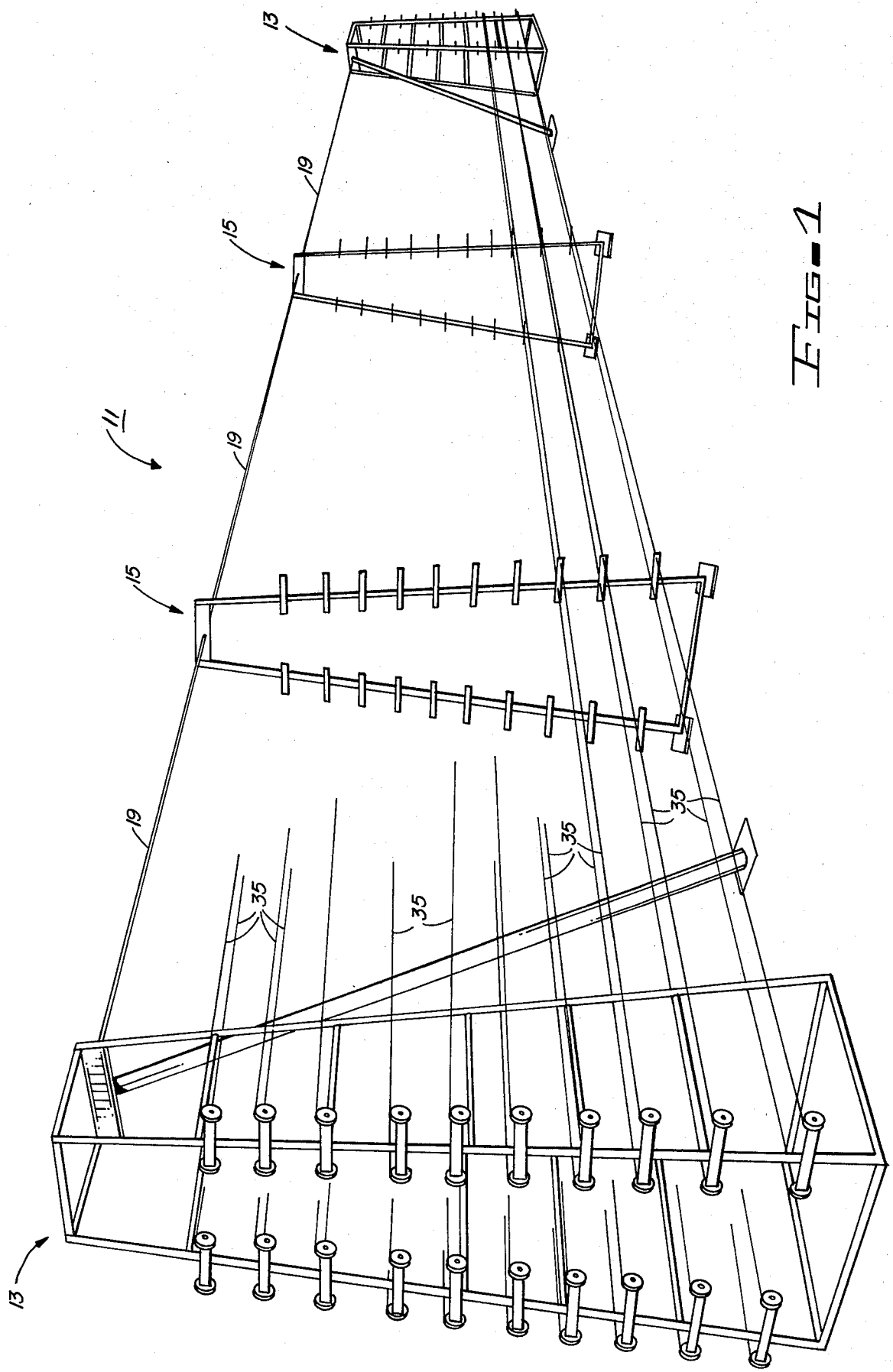
FIG. 1 is a perspective view of the system for supporting the containerized plant material.

The support system for potted plants of the present invention generally described as 11 in the schematic of FIG. 1 is characterized by a pair of truss members 13 parallelly disposed at either end of the system. A plurality of intermediate support members 15 are disposed in between the two truss members 13. The intermediate support members 15 are connected at the top by spacing wire 19 which is provided to maintain the spacing between the intermediate members 15 and to keep them in a vertical position.

Figure 2:
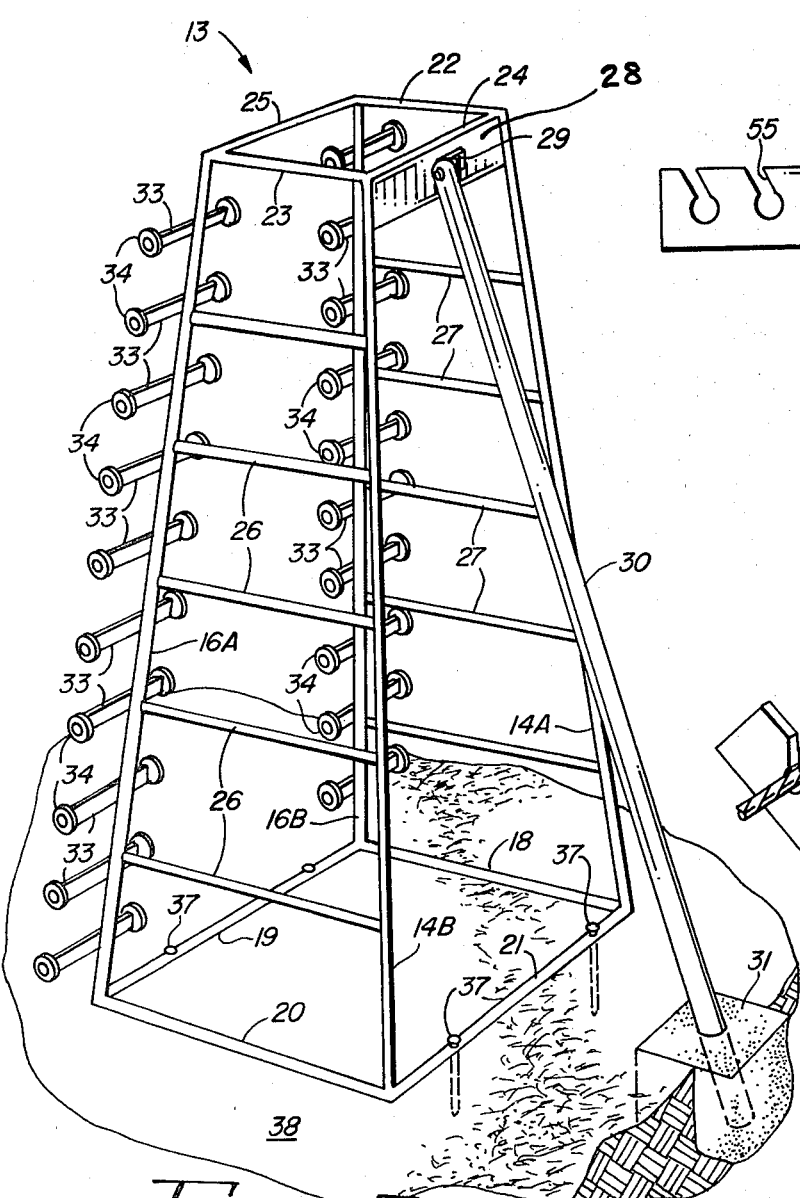
FIG. 2 is a perspective view of a truss member according to the present invention.

Illustrated in FIG. 2 is the pyramidal truss member 13 which comprises four substantially vertically disposed members 14A, 14B, 16A and 16B made of angle iron. Vertical member 14A and 16B are connected at the bottom by a base member 18 which may be approximately twelve inches long. Vertical members 16A and 16B are connected by a base member 19 which is approximately twenty-four inches long. Similarly the substantially vertical members 16A and 14B are connected by a base member 20 which is the same size as base member 18, and vertical members 14A and 14B are connected by base member 21 which is the same size as base member 19. Vertical member 16B is connected at the top to vertical member 14A with a top member 22 which may be approximately twelve inches long; and similarly, vertical members 16A and 14B are connected at the top by top member 23 which is the same size as top member 22. Vertical members 14B and 14A are connected at the top by top member 24 which may be approximately six inches wide; and vertical members 16A and 16B are connected at the top by top member 25 which also may be approximately six inches long. To provide a more rigid structure vertical members 16A and 14B are connected by a plurality of struts 26 disposed intermediately between the top and bottom of the structure and vertical members 14A and 16B are connected by means of struts 27. A flat plate 28 is attached to the top portion of the truss member 13 spanning and secured to vertical members 14A and 14B. Attached to the flat plate 28 is an L-shaped member 29. A steel tube 30 is attached to the L-shaped member 29 with a bolt. The bottom portion of steel tube 20 is set in the ground or it may be set in a concrete block 31 which is formed on the ground. The steel tube 30 provides for lateral rigidity of the truss member 13 and helps to bear a tension load on the truss.

A plurality of tension load bearing members 33 are attached to vertical members 16A and 16B. A turnbuckle 34 or other device capable of providing tension to a wire such as a TUGLUG is secured to each end of each tension load bearing member 33. Galvanized twelve gauge wire 35 (shown in FIG.1) is secured at the end to each end of each tension load bearing member 33 (see FIG. 1). Galvanized twelve gauge wire 35 is secured at the end to each turnbuckle 34 of the opposing truss members 13. The wires are then tensioned to about one hundred pounds of tension force on each wire 35. The result of the tension is to make the somewhat flexible wire 35 substantially rigid.

Figure 3:
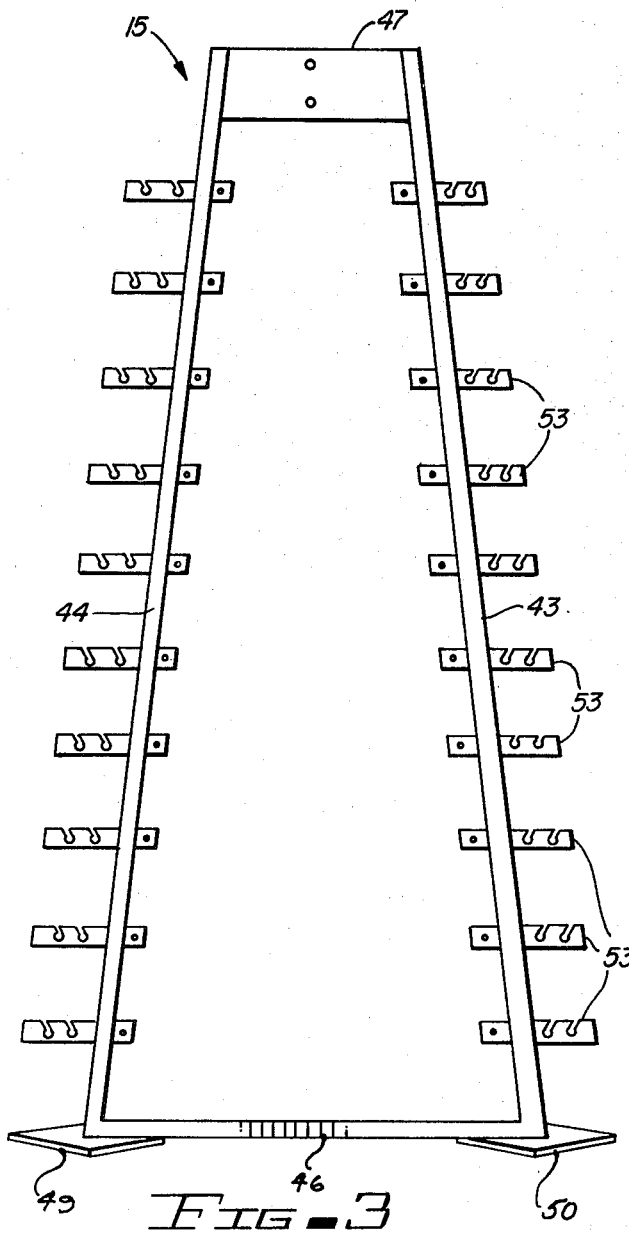
FIG. 3 is a front view of an intermediate support member.

The truss members 13 are secured with a plurality of bolts 37 to a poured concrete foundation 38. Illustrated in FIG. 3 is an intermediate support member 15. The support members 15 comprise a pair of spars 43 and 44 connected at the bottom by a brace beam 46 and at the top by a brace plate 47. The brace beam 46 is connected to a pair of foot plates 49 and 50 which serve to distribute the vertical load over a wider area thereby decreasing the stress at any point on the ground. The brace plate 47 is provided with at least one hole 51. Each bar 43 or 44 is provided with a plurality of spacer bars 53 disposed at intervals on the spar. The spacer bars may be welded on to each spar.

Figure 4:
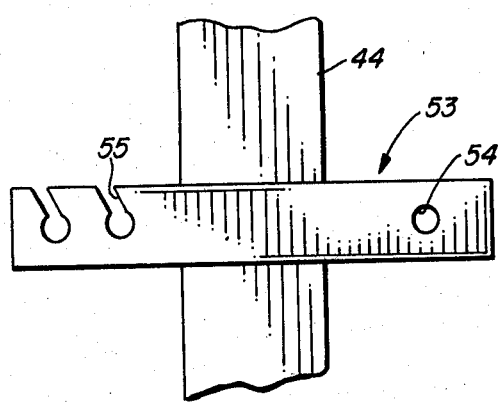
FIG. 4 is a front view of a spacer bar.

Illustrated in FIG. 4 is a detail side view of a spacer bar 53. The spacer bar 53 is made of a single plate preferrably of metal and has a permanent hole 54 and at least one open hole 55 disposed such that the open hole 55 has an opening on the side of the spacer bar 53 and is preferrably disposed at an angle from the center of the hole so that it can engage a wire which may be removed from one open hole 55 and inserted in another open hole.

Figure 5:
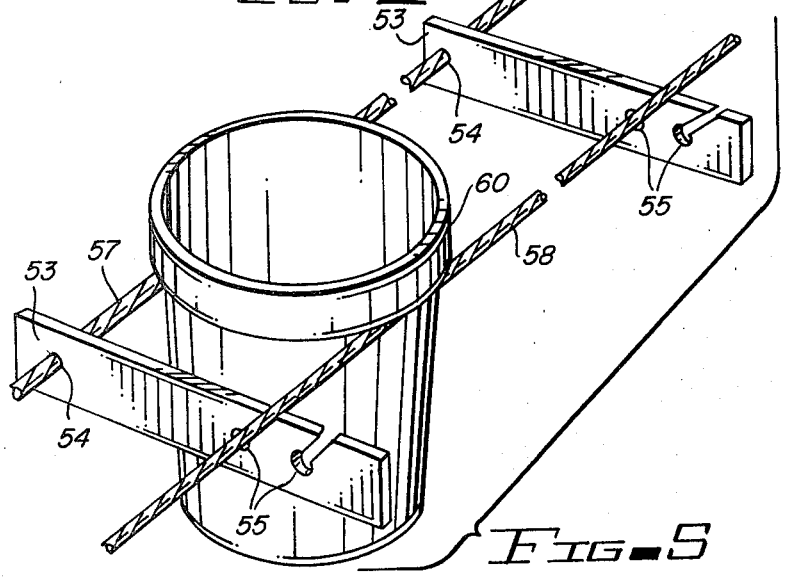
FIG. 5 is a perspective view of a pot being supported by parallel wires provided by the system.

The operation of the spacer bar 53 is best illustrated in FIG. 5. A wire 57 is inserted through permanent hole 54 of spacer bar 53. Wire 57 thus becomes fixed in the assembled structure. A wire 58 is provided and may be inserted in one of two open holes 55 depending on the distance desired between wires 57 and 58. A pot 59 having a flange 60 is inserted between wires 57 and 58, and the distance between the wires 57 and 58 is determined by the width of the flange 60 of a pot 59. The wires 57 and 58 thus support the pot with any plant material therein by engaging the flange 60. It should be understood that wires 57 and 58 are the same as those numbered as 35 in FIG. 1.

As can be appreciated by the description herein above, the pots are suspended and supported by substantially flexible wire. Since the wires will have a tendency to sag with the weight of the potted plants, tension must be provided at the truss members so that the wires are maintained taut and thereby substantially rigid even in the loaded state.

Figure 6:
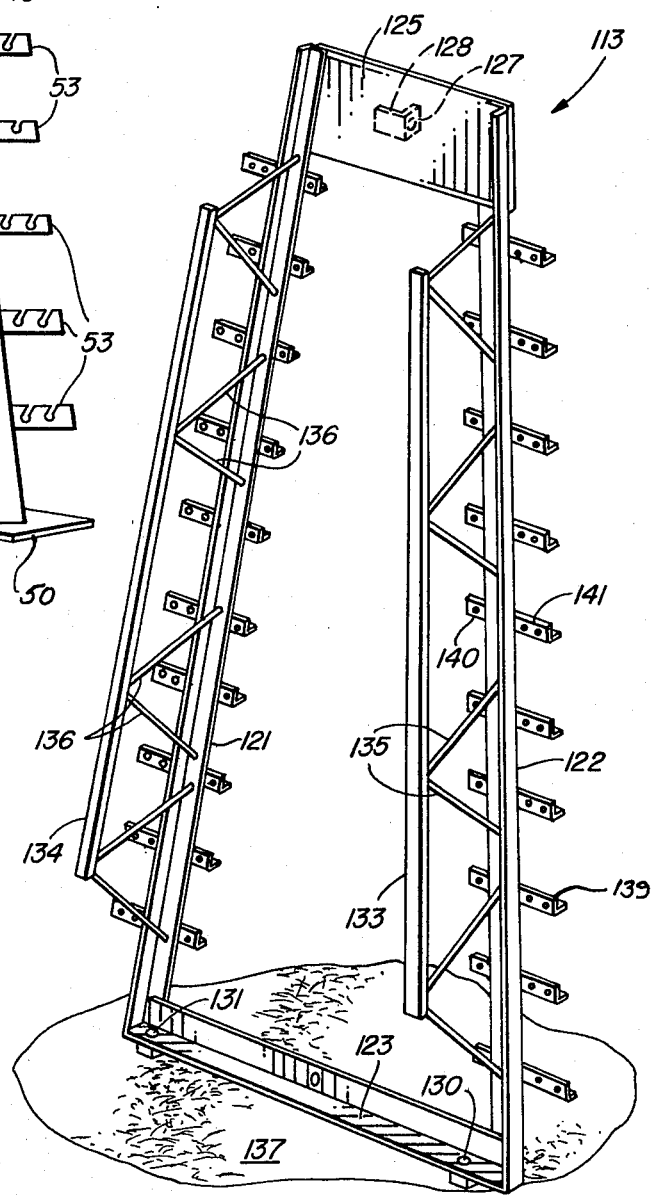
FIG. 6 is an alternate embodiment of a truss member.

Illustrated in FIG. 6 is an alternate embodiment of the truss member 113 comprising an A-frame, or tapered trapezoidal member, having a pair of substantially vertically disposed beams 121 and 122. These beams may be made of any strong material of appropriate cross-section, and it has been found that steel beams with an L-shaped cross-section are adequate for this purpose. The two substantially vertical beams 121 and 122 are connected at the bottom by a connecting beam 123 preferrably by means of welding, although any other type of rigid connection may be provided. The two substantially vertical beams 121 and 122 are connected at the top by a flat plate 125 which is substantially smaller in width than the connecting beam 123. Thus, the basic structure which is disposed vertically will have a taper towards the top. An L-shaped connecting piece 127 is provided with a hole 128 and is welded on to the flat plate 125. The L-shaped connecting piece 127 is disposed on the flat plate so that the hole 128 is disposed substantially at the center of the flat plate 125. The connecting beam 123 may be provided with holes 130 and 131 at the bottom to accommodate bolts for securing the connecting beam 123 to a foundation. A pair of rods 133 and 134 are parallelly disposed a predetermined distance from the substantially vertical beams 121 and 122. Rod 133 is connected to beam 122 by means of a plurality of struts 135. Similarily, rod 134 is connected to vertical beam 121 by means of a plurality of struts 136. The struts are preferably welded to the rods and the substantially vertical beams although other connecting means may be used. Bolts (not shown) may be provided through holes 130 and 131 to engage concrete foundation 137 which may be poured in the ground. A plurality of support bars 139 are secured on intervals on each beam 121 and 122. The support bars 139 will preferrably have an L-shaped cross-section and will be provided with at least two holes 140 and 141. A plurality of pairs of turnbuckles (not shown) may be placed in holes 140 and 141. Wires, 35, are secured to the turnbuckles at the ends and are then tensioned as described above.

Figure 7:
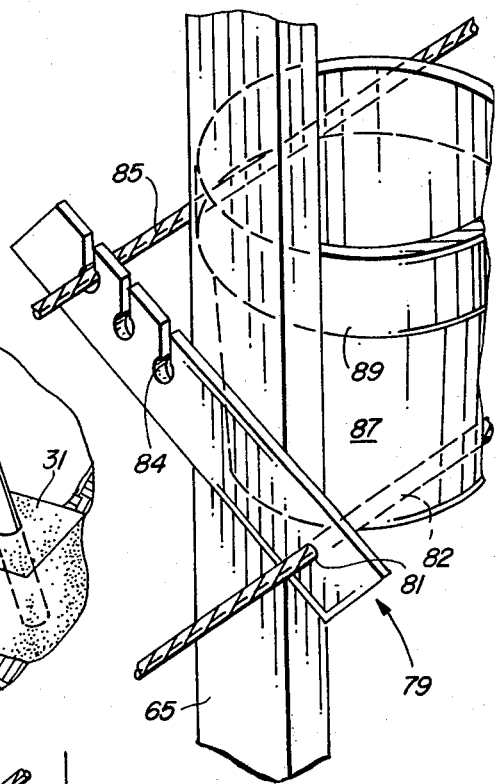
FIG. 7 is a perspective view of an alternate method of supporting the potted plants.

An alternate embodiment is also illustrated in FIG. 7 showing a different type of spacer bar 79 which is disposed at an angle with respect to vertical members 65, which may be spars 43 or 44 in FIG. 3. Spacer bar 79 is provided with at least one hole 81 adapted to engage a wire 82 that remains fixed when the system is assembled. Spacer bar 79 is also provided with a plurality of open holes 84 which are adapted to engage a wire 85. The open holes 84 are disposed at intervals along the spacer bar 79 which correspond to different size of pots to be used with the system. In the configuration illustrated in FIG. 7, a pot 87 is supported at the bottom by wire 82. The pot 87 may be provided with a flange 89. The pot 87 is supported laterally by resting against variable wire 85, so this embodiment can be used on pots without flanges. Wires 82 and 85 are disposed so that the center of gravity of the potted plant 87 falls in a vertical plane between wires 82 and 85. It should be understood that wires 82 and 85 are numbered as 35 in FIG. 1.

The system described herein above creates a healthier environment for growing plants. This is because of the vertical design and the use of wires to suspend the containers. The vertical design allows the air to pass freely on all sides of the plants. This helps eliminate stagnant air pockets where bacteria and fungus can breed. It also helps maintain dry foliage which is essential to the elimination of foliar diseases. Spray programs are more efficient because the elevation of the rack exposes the plants for better and uniform coverage.

The use of wires to support the containers eliminates the flat surface where contaminants breed. It also reduces the losses from turned containers and increases the light available which would be blocked with the use of a stair step growing system of flat surfaces.

Productivity of the labor force is greatly improved. Stooping is significantly reduced and because all the plants are easily accessable, the stretching is eliminated. This means less worker fatigue and greater productivity. The cost of weed control are reduced with the plants off the ground.

The foremost feature of the system, and the one that gives it the greatest economic advantage over other systems, is its ability to function both as an active and passive energy conservation device. Actively, the rack acts as a solar collector. The mass of soil containerized on the sides of the frame collect heat during the day and give off this heat during the night. During the summer this same mass of soil gives off moisture through evaporation. This process acts as an evaporative cooling system, dropping the temperature within the green houses without the use of cooling pads, pumps and water currently in use. It conserves both water and energy as well and eliminates the cost and maintenance of the normal system. Passively, there is more efficient utilization of space in a nursery, thereby decreasing per unit cost of such variables as heating and cooling. It has been estimated that significantly more plants can be grown within the same space as can be grown with systems now in use in most nurseries.

Thus, this description encompasses a method of growing plants in a nursery by suspending potted plants in the apparatus herein above described.

I claim:

1. An apparatus for supporting a plurality of plants in flanged pots off the ground comprising
    a plurality of wire sets each comprising two substantially parallel horizontally disposed flexible wires;
    means coupled to each flexible wire for providing tension to the wire and rendering the wires rigid in a vertical direction;
    a plurality of means disposed at predetermined intervals for bearing vertical loads due to the weight of the potted plants; and
    means for bearing a horizontal load due to the tension on the wires, whereby the flanged pots are supported by the parallel wires.

2. The apparatus of claim 1 wherein said means for bearing a horizontal load due to the tension of the wires comprises a first truss member anchored to the ground and coupled to one end of each of said wires and a second truss member anchored to the ground coupled to the other end of each of said wires.

3. The apparatus of claim 2 wherein said means for providing tension to each wire comprises a turn buckle attached to said truss member.

4. The apparatus of claim 3 wherein each means for bearing vertical loads comprises an upwardly tapered trapezoidal member, a pair of plates attached to each bottom corner of said trapezoidal members and a plurality of spacer bars each having at least two holes through which the wires are inserted thereby bearing the vertical loads on the wires and maintaining a uniform spacing between the parallel wires.

5. The apparatus of claim 4 wherein the holes on each spacer bar are disposed in the same horizontal plane thereby causing each wire set to lie in a horizontal plane, and each wire of a wire set supporting one side of the flange of a pot.

6. The apparatus of claim 4 wherein the holes on each spacer bar are not disposed on a horizontal plane and one wire of a wire set engages the flange of the pot and the other wire supports the bottom of the pot.

7. The apparatus of claim 4 wherein at least one of said holes is open on a side of the spacer bar whereby the wire to be inserted in the hole can be removed and placed in another hole.

8. The apparatus of claim 2 wherein said truss member comprises a vertically tapered trapezoidal member;
    a rod disposed parallel to each side of the trapezoidal member; and
    a plurality of strut means for attaching each rod to each side of the trapezoidal member.

9. The apparatus of claim 2 wherein said truss member comprises a truncated pyramidal member.

10. A method of increasing the capacity and efficiency of an enclosed nursery for growing potted plants comprising the steps of:
    erecting an upwardly tapering structure for supporting a plurality of wires;
    disposing a plurality of wire sets, each comprising two parallel wires, on said structure, whereby the wire sets are disposed in a stepped fashion;
    disposing a plurality of flanged pots with plants between each wire set.

* * * * *